United States Patent
Kusumoto

(10) Patent No.: US 7,226,114 B2
(45) Date of Patent: Jun. 5, 2007

(54) BODY STRUCTURE FOR VEHICLE HAVING SLIDING DOOR

(75) Inventor: Kozo Kusumoto, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 11/120,605

(22) Filed: May 3, 2005

(65) Prior Publication Data

US 2005/0253421 A1 Nov. 17, 2005

(30) Foreign Application Priority Data

May 11, 2004 (JP) ............................. 2004-140986

(51) Int. Cl.
*B60J 5/06* (2006.01)
(52) U.S. Cl. ..................................... 296/155
(58) Field of Classification Search ................. 296/155
See application file for complete search history.

(56) References Cited

U.S. PATENT DOCUMENTS

2003/0071484 A1* 4/2003 Okubo et al. ............... 296/155

FOREIGN PATENT DOCUMENTS

| JP | 5-17294 | 5/1993 |
| JP | 11-278057 | * 10/1999 |
| JP | 2002-12034 | * 1/2002 |
| JP | 2003-154851 | * 5/2003 |

* cited by examiner

*Primary Examiner*—Dennis H. Pedder
(74) *Attorney, Agent, or Firm*—Rankin, Hill, Porter & Clark LLP

(57) ABSTRACT

A body structure for a vehicle having a sliding door. The structure has a slide rail, provided in a side face of the vehicle, for guiding the sliding door; and a rail cover, having a cover portion and an extension, for covering the slide rail. The cover portion extends along a lower edge of a rear side glass of the vehicle, and the extension extends from a rear end portion of the cover portion along a rear pillar of the vehicle. The rail cover is positioned for the vehicle's body in a front-rear direction and a vertical direction via the rear end portion of the cover portion. The rail cover may be further positioned in the vertical direction via a front end portion of the cover portion. A screening member may be provided between a rear edge of the extension and a panel of the vehicle's body.

9 Claims, 7 Drawing Sheets

BODY STRUCTURE FOR VEHICLE HAVING SLIDING DOOR

BACKGROUND OF THE INVENTION

1. Field of the Invention

The present invention relates to a body structure for vehicles having a sliding door.

Priority is claimed on Japanese Patent Application No. 2004-140986, filed May 11, 2004, the content of which is incorporated herein by reference.

2. Description of Related Art

In conventional vehicles having a sliding door, a rail cover may be provided for covering a slide rail which is arranged at the back of the sliding door (see, for example, Japanese Unexamined Utility Model Application, First Publication No. H05-017249). In the disclosed rail cover, a lower portion overlaps with the slide rail in the vehicle's width direction, and the slide rail is covered except for a gap, provided between the lower edge of the rail cover and the vehicle body panel, for guiding a door support arm. An upper edge portion of the above rail cover forms a parting line together with a lower edge of the rear side glass which is arranged above the slide rail, so as to prevent a panel joint line from appearing in a vicinity of the rear side glass.

However, even in the above structure, a panel joint line between the rail cover and the vehicle body panel may be produced in the vicinity of the rear pillar at the back of the rear side glass, which affects the appearance of the vehicle, and relevant improvement has been required.

In addition, the rail cover is arranged from a lower edge portion of the rear side glass over the slide rail and is thus a relatively large member. Therefore, improvement in performance of mounting the rail cover to the vehicle body has also been required.

SUMMARY OF THE INVENTION

In view of the above circumstances, an object of the present invention is to provide a body structure for vehicles having a sliding door, for preventing generation of a panel joint line between the rail cover and a vehicle body panel, so as to improve the appearance of the vehicle and the performance of mounting the rail cover to the vehicle body.

Therefore, the present invention provides a body structure for a vehicle having a sliding door (e.g., a rear door 3 in an embodiment explained later), the structure comprising:

a slide rail (e.g., a center slide rail 6 in the embodiment), provided in a side face of the vehicle, for guiding the sliding door; and a rail cover (e.g., a rail cover 10 in the embodiment), having a cover portion (e.g., a cover portion 11 in the embodiment) and an extension (e.g., an extension 12 in the embodiment), for covering the slide rail, wherein the cover portion extends along a lower edge of a rear side glass (e.g., a rear side glass 8 in the embodiment) of the vehicle, and the extension extends from a rear end portion of the cover portion along a rear pillar (e.g., a rear pillar 16 in the embodiment) of the vehicle, and the rail cover is positioned for a body of the vehicle in a front-rear direction and a vertical direction via the rear end portion of the cover portion.

According to the above structure, it is possible to prevent a joint line from appearing between the vehicle body panel and the rail cover in the vicinity of the rear pillar, thereby improving the appearance of the vehicle. The rail cover is a relatively large member including the cover portion and the extension. However, the rail cover is positioned in a well-balanced form via the rear end portion of the cover portion (i.e., the joint portion of the cover portion and the extension), thereby easily securing a desired accuracy in mounting of the whole rail cover and improving the performance of mounting the rail cover.

The rail cover may be further positioned in the vertical direction via a front end portion of the cover portion. Accordingly, it is possible to easily secure desired accuracies in positioning in the vertical direction and for inclination.

Typically, the extension has a rear edge which faces a back of the vehicle, and the body structure may further comprise a screening member (e.g., a screening cover 50 in the embodiment) provided between the rear edge of the extension and a panel of the body of the vehicle. Accordingly, no joint line appears between panels in the vicinity of the rear pillar, and a gap between the rear edge of the extension and the vehicle body panel is covered by the screening member. Therefore, it is possible to further improve the appearance of the vehicle.

As a preferable example, the rail cover has a hollow and closed-section structure. Accordingly, the weight of the rail cover, which is a relatively large member, can be reduced and the rigidity of the rail cover can be improved. Therefore, the rail cover can be easily handled, and performance in mounting the rail cover can be further improved.

The body structure may further comprise an elastic member (e.g., a seal member 36 in the embodiment) inserted between inner faces of the rail cover, which face each other. Accordingly, it is possible to prevent reverberating sound from being generated when vibration acts on the rail cover. Therefore, it is possible to improve salability.

DETAILED DESCRIPTION OF THE INVENTION

Figure 1:
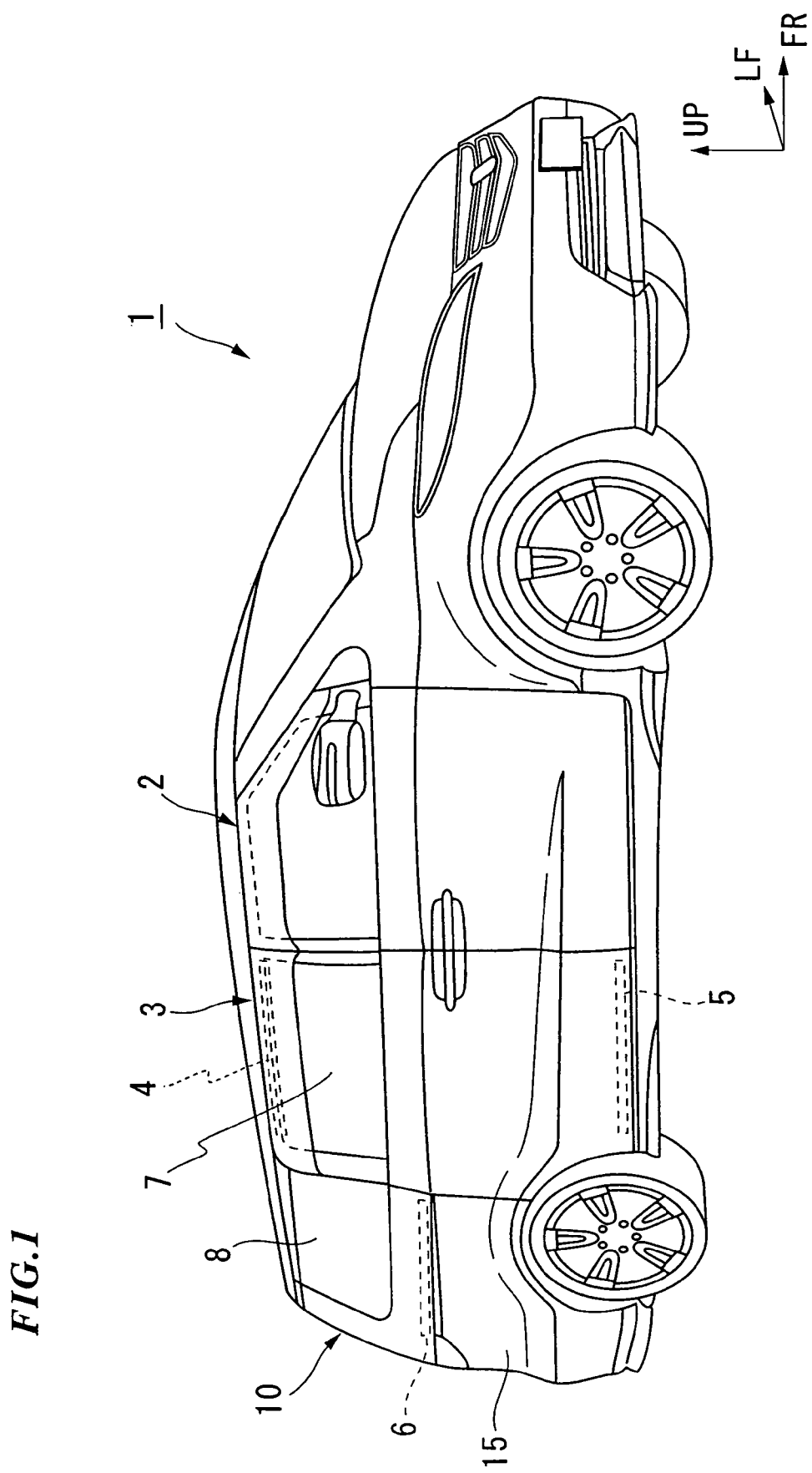
FIG. 1 is a perspective view of a vehicle in an embodiment of the present invention, which is viewed from a front-right side of the vehicle.

Hereinafter, embodiments according to the present invention will be explained with reference to the drawings.

In the following explanations, the directions such as front, rear, left, and right are those of the vehicle unless specified otherwise. In the drawings, arrows FR, LF, and UP respectively indicate the front, left, and upward directions of the vehicle.

FIG. 1 is a perspective view of a vehicle in an embodiment of the present invention, which is viewed from a front-right side of the vehicle. The vehicle 1 is a so-called "1.5-box" passenger car having a relatively small engine room which is provided at the front of a 1-box form vehicle body. The vehicle 1 has a front door 2 and a rear door 3, each for opening or closing an opening provided in a side wall of the vehicle. The opening and closing operation of the front door 2 is performed using a hinge which rotates around a hinge axis in a vertical direction, defined in a vicinity of the front edge of the front door 2. The opening and closing operation of the rear door 3 is performed by sliding the door along a side wall of the vehicle.

The upper and lower ends of the rear door 3 are slidably supported by an upper slide rail 4 and a lower slide rail 5, which are respectively arranged at the upper edge and the lower edge of the opening in the side wall of the vehicle, and which are oriented in the front-rear direction of the vehicle. In addition, a substantially center portion (in the vertical direction) of the rear edge of the rear door 3 is slidably supported by a center slide rail 6 which is arranged at the back of the opening in the side wall and is oriented in the front-rear direction of the vehicle.

In order that the slide rails 4, 5, and 6 are not exposed to the outside of the vehicle body, the upper slide rail 4 and the lower slide rail 5 are each covered by the closed rear door 3, while the center slide rail 6 is covered by a rail cover 10 is a member independent of the vehicle body.

Figure 2:
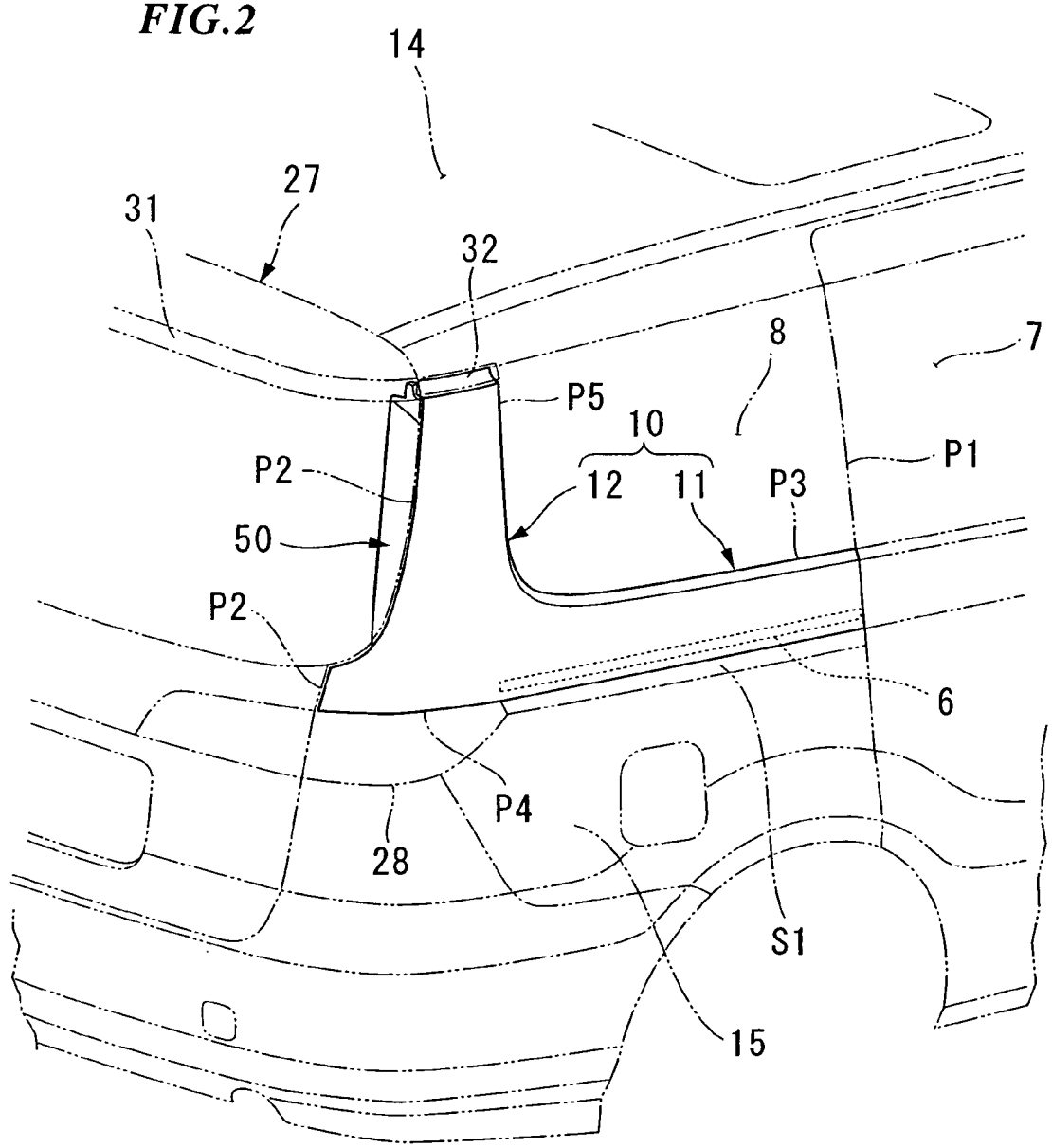
FIG. 2 is a perspective view of a rear portion of the vehicle, viewed from a right-back side of the vehicle.
Figure 3:
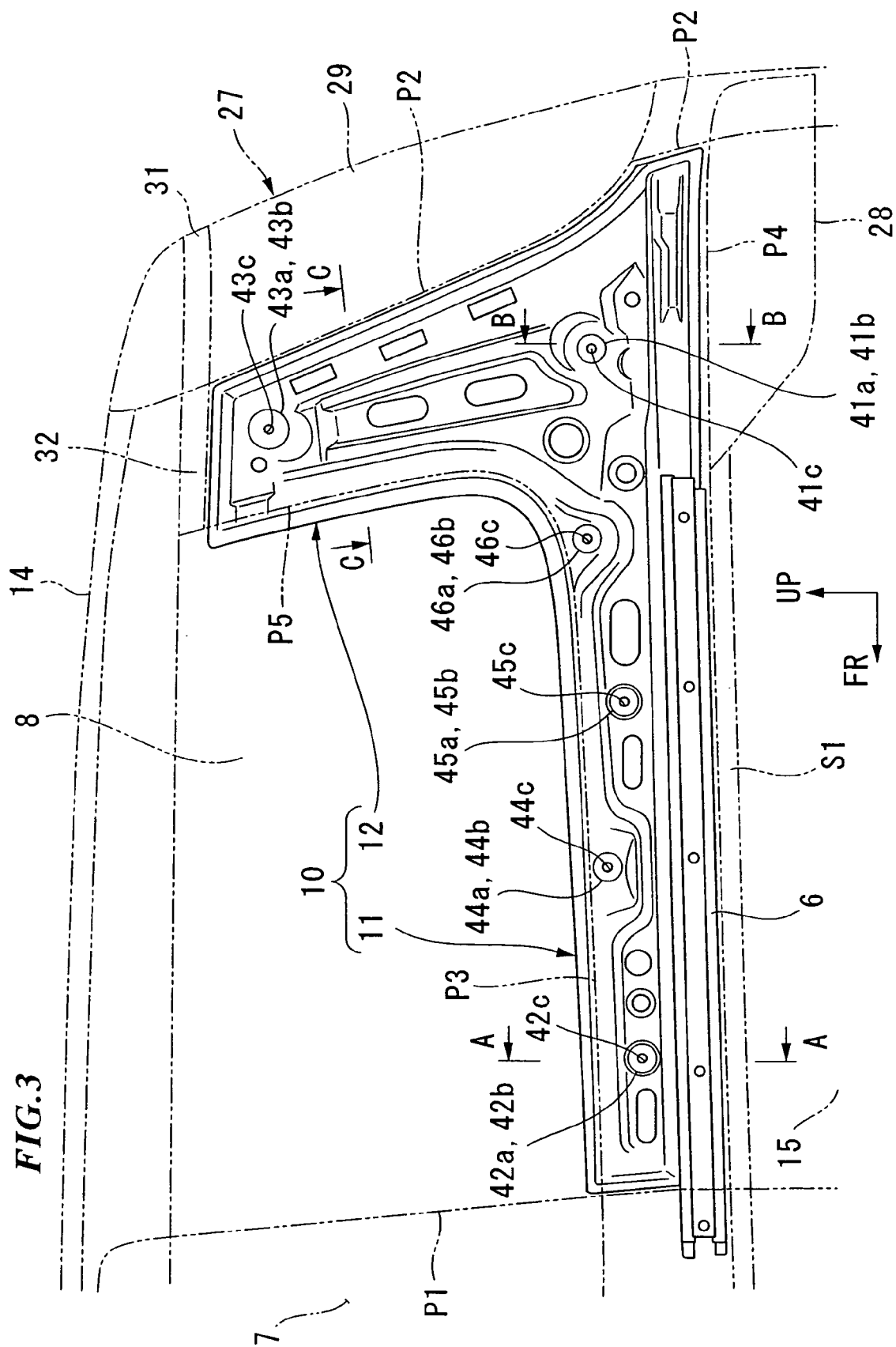
FIG. 3 is a side view of the rail cover provided at the vehicle body's right side, which is viewed from the vehicle body's left side.

FIG. 2 is a perspective view of a rear portion of the vehicle, viewed from a right-back side of the vehicle. FIG. 3 is a side view of the rail cover provided at the vehicle body's right side, which is viewed from the vehicle body's left side. With reference to FIGS. 2 and 3, the rail cover 10 has (i) a cover portion 11 extending in the front-rear direction of the vehicle so as to actually cover the center slide rail 6, and (ii) an extension 12 extending upward from a rear portion of the cover portion 11; thus, the rail cover 10 has substantially an L-shaped side view.

Behind the door glass 7 of the rear door 3, a rear side glass 8 is provided, which has a substantially rectangular shape in a side view of the vehicle. The cover portion 11 and the extension 12 are provided in a manner such that the cover portion 11 is arranged along the lower edge of the rear side glass 8 and the extension 12 is arranged along the rear edge of the rear side glass 8.

Figure 7:
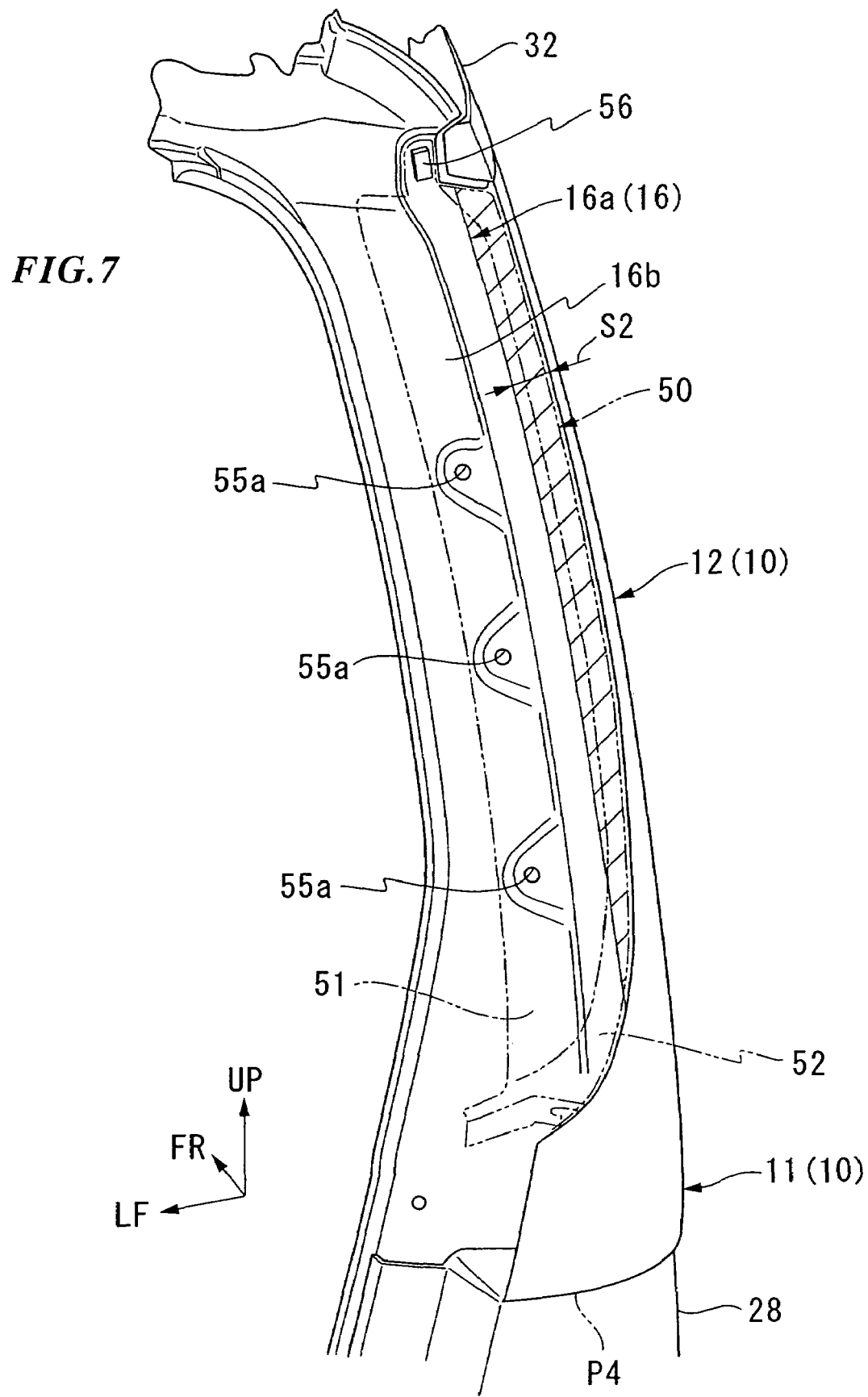
FIG. 7 is a diagram for showing a right edge of the rear opening of the vehicle body, viewed from around the back side of the vehicle.

FIG. 7 is a diagram for showing a right edge of the rear opening of the vehicle body, viewed from around the back side of the vehicle. By referring to FIG. 7 together, a rear pillar 16 is arranged at the inside of the extension 12 and a rear end portion of the cover portion 11 (i.e., the rear pillar 16 is closer to the vehicle interior), between the roof 14 and the rear fender 15 of the vehicle. Accordingly, the extension 12 is arranged along the rear pillar 16.

Figure 4:
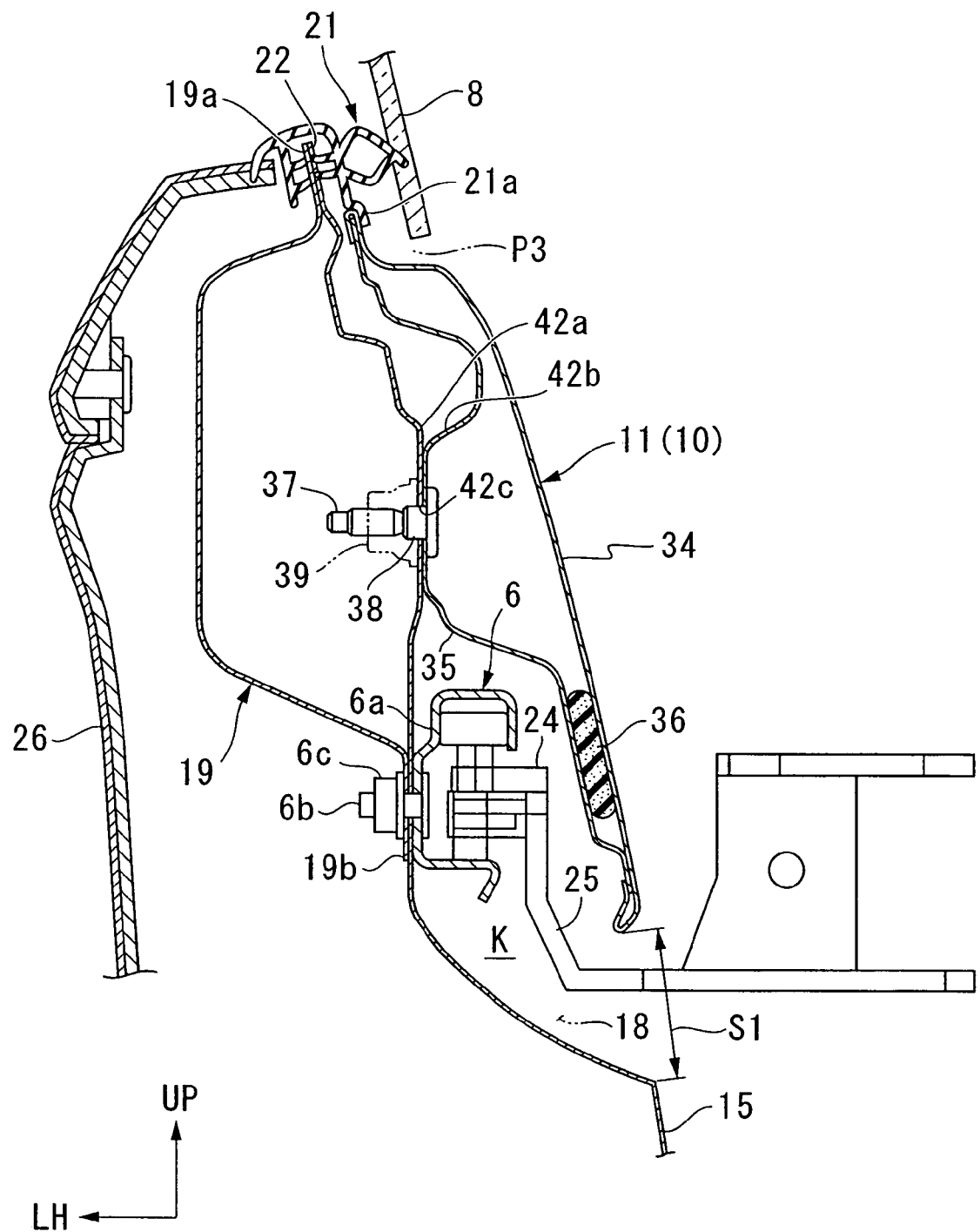
FIG. 4 is a cross-sectional view along lines A in FIG. 3.

FIG. 4 is a cross-sectional view along lines A in FIG. 3. As shown in FIG. 4, the rear fender 15 has a concave portion 18, which is hollow toward the vehicle interior in the vehicle's width direction and is formed from the lower edge of the rear side glass 8 over a peripheral portion of the center slide rail 6 which is located below the rear side glass 8. The cover portion 11 is attached to the concave portion 18 so as to form an outer face of the vehicle body, instead of the rear fender 15.

A pillar outer portion 16a as an outer portion of the rear pillar 16 is arranged inside the outer face of the vehicle (see FIGS. 6 and 7), and the extension 12 of the rail cover 10 functions as an outer face of the vehicle body, instead of the pillar outer portion 16a. A reinforcement 19 having a substantially hat-form cross-section is attached to the inside of a portion immediately below the rear side glass 8 and is arranged in the front-rear direction of the vehicle. The reinforcement 19 and the rear fender 15 form a closed-section structure, which functions as an under-glass member of the framework of the vehicle.

The rear fender 15 has a support flange 22 for supporting a weather strip 21 for the rear side glass 8. The reinforcement 19 has an upper joint flange 19a joined to the support flange 22 from the vehicle interior side, and a lower joint flange 19b joined (also from the vehicle interior side) to a portion having substantially the same height as the height of the center slide rail 6.

The center slide rail 6, arranged at a lower portion of the concave portion 18 of the rear fender 15 and oriented in the front-rear direction, has a substantially U-shaped cross-section which is open toward the outside in the vehicle's width direction. In the bottom wall 6a of the center slide rail 6, weld bolts 6b are provided, which protrude toward the vehicle interior in the vehicle's width direction and pass through the rear fender 15 and the lower joint flange 19b of the reinforcement 19. Nuts 6c are screwed and fastened from the vehicle's interior side onto the weld bolts 6b, thereby fastening the center slide rail 6 to a portion immediately below the above-explained under-glass member.

In the center slide rail 6, a roller unit 24 is provided, which can freely move in the length direction of the center slide rail 6. An end of a door support arm 25 is connected to the roller unit 24. In FIG. 4, reference symbol K indicates a rail arrangement space defined by a lower portion of the cover portion 11, which covers and divides the space from the outside of the vehicle. In the rail arrangement space K, the door support arm 25 extends from the roller unit 24 downward as leaving the center slide rail 6, and then changes its course so as to extend through a gap S1 formed between the lower edge of the cover portion 11 and the lower edge of the concave portion 18 and reaches a connection point with the rear door 3.

The vertical width of the gap S1 is less than the vertical width of the center slide rail 6, so that in contrast with a case in which the center slide rail 6 is exposed to the outside of the vehicle body, the center slide rail 6 is not exposed. Additionally, in FIG. 4, reference numeral 26 indicates a trimming member for a trunk of the vehicle.

As shown in FIGS. 2 and 3, the cover portion 11 of the rail cover 10 extends backward from a door back parting line P1 defined at the rear side of the rear door 3, and then turns around a corner of the vehicle body and reaches a gate side parting line P2 defined at a side of a tail gate 27 for opening and closing the opening at the vehicle body's rear wall. The upper edge of the rail cover 10 forms a glass lower parting line P3 together with the lower edge of the rear side glass 8. The lower edge of the cover 11 functions as the upper edge of the gap S1 for extending the door support arm 25. The rear end of this lower edge forms a part of a lamp upper parting line P4 together with the upper edge of a rear combination lamp 28 positioned at the back of the gap S1.

The extension 12 of the rail cover 10 extends along the rear pillar 16 upward from the rear end of the cover portion 11 to a rear end of the roof 14 of the vehicle, while slightly inclining in a manner such that the higher it is, the closer to the front of the vehicle. The front edge of the extension 12 forms a glass back parting line P5 together with the rear edge of the rear side glass 8. The rear edge of the extension 12 forms an upper half of the gate side parting line P2 together with a side edge of the tail gate glass 29 provided along a corner of the vehicle body.

The rear edge of the extension 12 and the rear end of the cover portion 11 face the vehicle body' rear side (or rear end) and thus face the tail gate 27 in the substantially front-rear direction. Between the upper end of the extension 12 and the roof 14, a side reflector 32 is provided, which is continuously joined to a reflector 31 provided along the upper edge of the tail gate glass 29.

Figure 5:
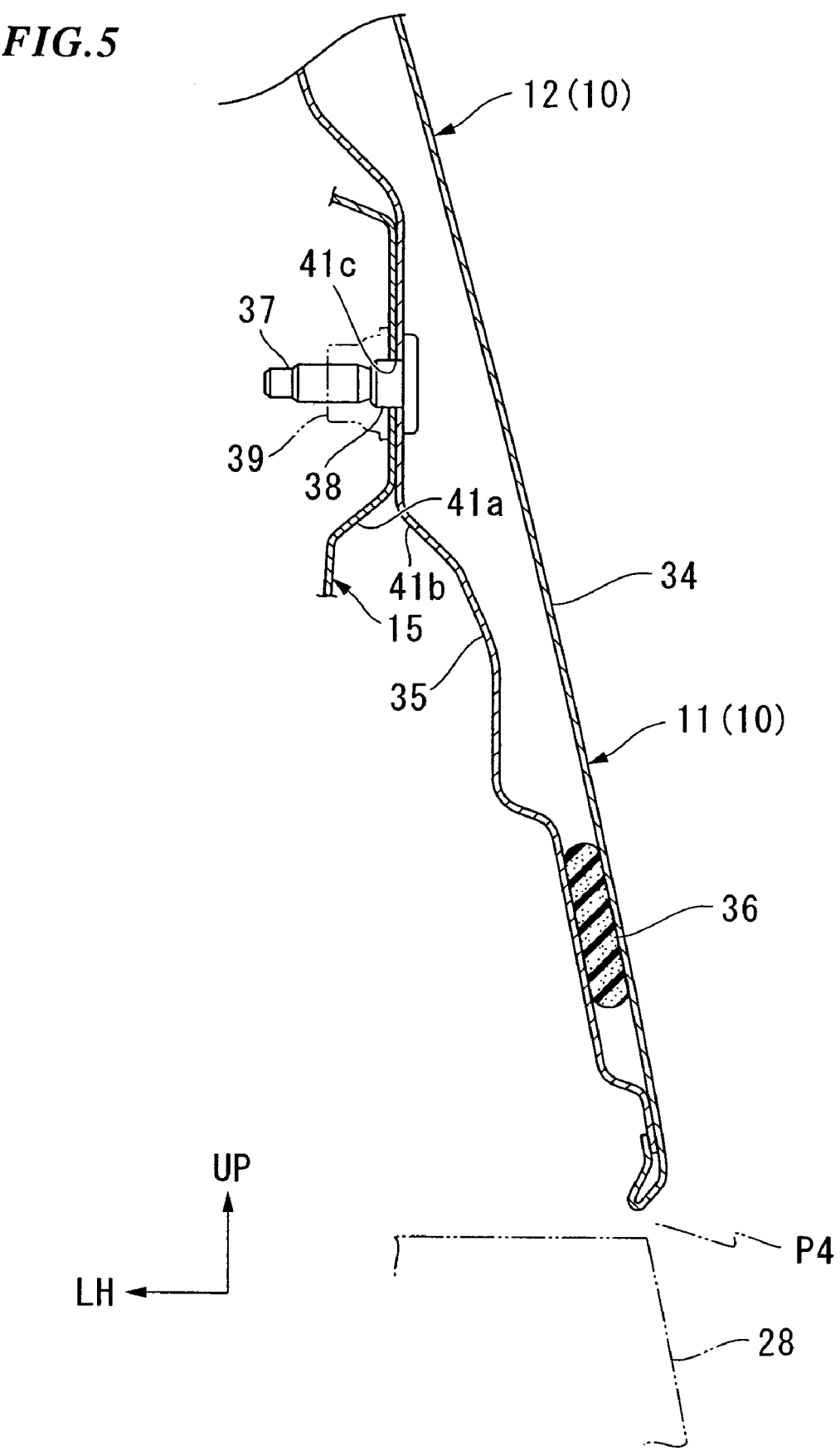
FIG. 5 is a cross-sectional view along lines B in FIG. 3.
Figure 6:
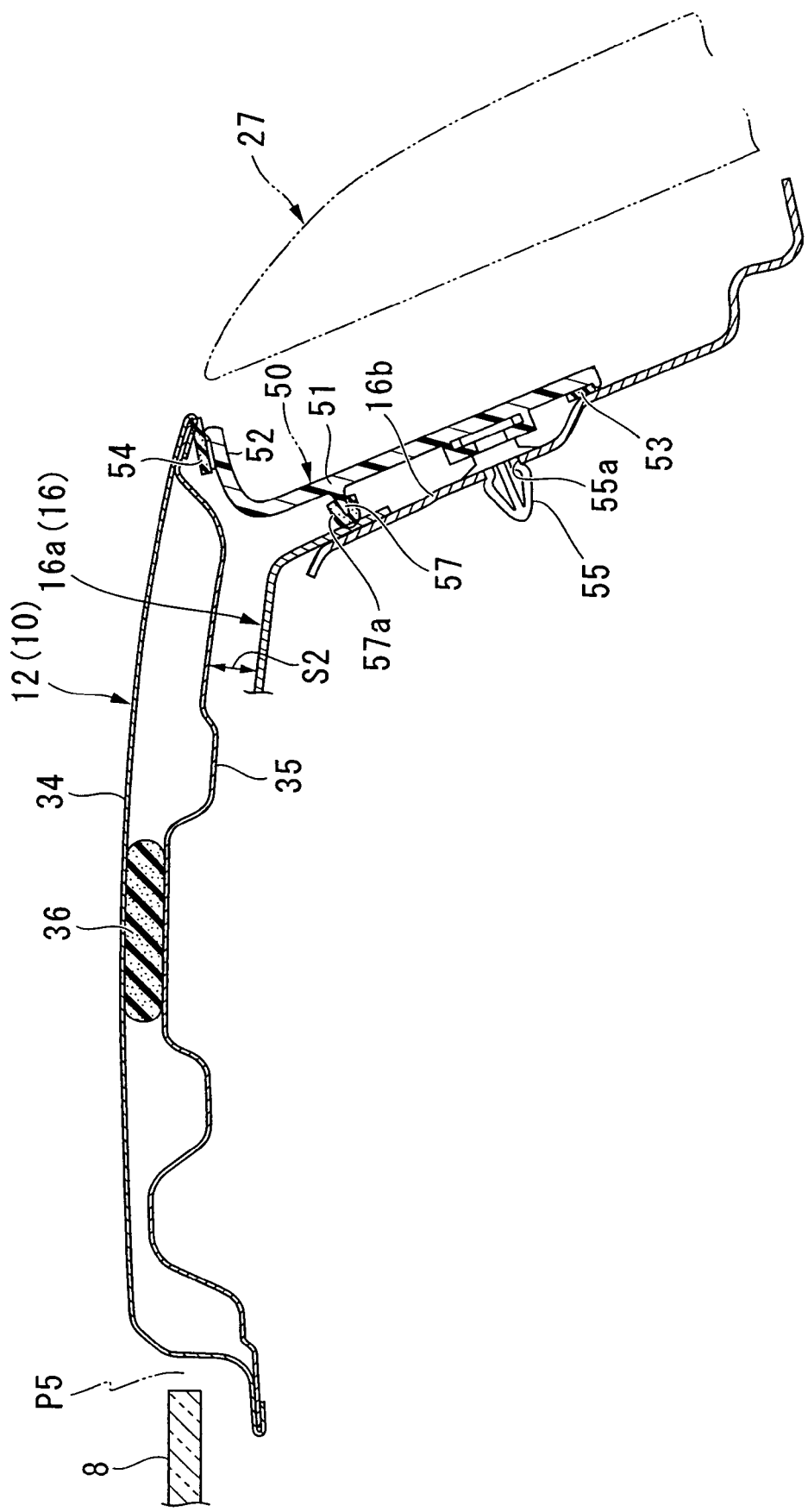
FIG. 6 is a cross-sectional view along lines C in FIG. 3.

FIG. 5 is a cross-sectional view along lines B in FIG. 3, and FIG. 6 is a cross-sectional view along lines C in FIG. 3.

As shown in FIGS. 4 to 6, the rail cover 10 forms a hollow and closed-section structure by hemming and joining outer edges of a cover outer portion 34 and a cover inner portion 35 which are made using steel plates. In the rail cover 10, an elastic seal member 36 having elasticity even after curing is inserted to a portion where the cover outer portion 34 and the cover inner portion 35 are closer to each other, and both inner faces of the cover outer portion 34 and the cover inner portion 35 receive the seal member 36.

As shown in FIG. 5, in the inside wall (i.e., closer to the vehicle interior) of a rear portion of the cover portion 11, that is, of a lower end portion of the extension 12, the cover inner portion 35 has a first pedestal portion 41b which corresponds to a first pedestal portion 41a of the rear fender 15. The first pedestal portion 41b has an inner face which contacts an outer face of the first pedestal portion 41a.

In the first pedestal portion 41b, a weld bolt 37 is provided in a manner such that the portion under the head of the bolt protrudes from the center of the inner face of the pedestal portion 41b toward the vehicle interior in the vehicle's width direction. A first bolt through hole 41c is provided at the center of the outer face of the first pedestal portion 41a, through which the under-head portion of the weld bolt 37 can pass. Here, the weld bolt 37 has a step form which includes a cylindrical shaft portion 38 at the base of the under-head portion.

Regarding the pedestal portions, similar structures will be explained by referring to FIG. 3.

In the inside wall of a front portion of the cover portion 11, the cover inner portion 35 has a second pedestal portion 42b which corresponds to a second pedestal portion 42a of the rear fender 15. A weld bolt 37 is provided at the second pedestal portion 42b, and a second bolt through hole 42c for this weld bolt 37 is provided in the second pedestal portion 42a (see FIG. 4).

In the inside wall of an upper end portion of the extension 12, the cover inner portion 35 has a third pedestal portion 43b which corresponds to a third pedestal portion 43a of the rear fender 15. A weld bolt 37 is provided at the third pedestal portion 43b, and a third bolt through hole 43c for this weld bolt 37 is provided in the third pedestal portion 43a.

Additionally, between the first pedestal portion 41b and the second pedestal portion 42b of the cover inner portion 35, a fourth pedestal portion 44b, a fifth pedestal portion 45b, and a sixth pedestal portion 46b are provided, which respectively correspond to a fourth pedestal portion 44a, a fifth pedestal portion 45a, and a sixth pedestal portion 46a provided at substantially regular intervals between the first pedestal portion 41a and the second pedestal portion 42a of the rear fender 15. The fourth pedestal portion 44a, the fifth pedestal portion 45a, and the sixth pedestal portion 46a respectively have a fourth bolt through hole 44c, a fifth bolt through hole 45c, and a sixth bolt through hole 46c for weld bolts 37 provided at the fourth pedestal portion 44b, the fifth pedestal portion 45b, and the sixth pedestal portion 46b.

As shown in FIGS. 4 and 5, the shaft portion 38 of the weld bolt 37 is inserted to a corresponding bolt through hole while the rail cover 10 is attached to the vehicle body. Therefore, a dedicated nut 39 having an escape space for the shaft portion 38 is screwed and fastened onto the under-head portion of the inserted weld bolt 37, thereby fastening the rail cover 10 to the vehicle body.

Below, positioning of the rail cover 10 with respect to the vehicle body will be explained by referring to FIG. 3. First, the rear end portion of the cover portion 11, which is continuously joined to the extension 12, is positioned as a basis of positioning of the whole rail cover 10. Specifically, the first bolt through hole 41c is prepared as a circular hole which matches the all-around circumference of the shaft portion 38 of the weld bolt 37, thereby positioning the rear end portion of the cover portion 11 in both the vertical direction and the front-rear direction. The positioning of the rear end portion in the right-left direction is performed by making the first pedestal portion 41b and the first pedestal portion 41a to contact with each other.

Next in order to determine the vertical position and the inclination of the rail cover 10, a front end portion of the cover portion 11, a longer member in the front-rear direction, is positioned. Specifically, the second bolt through hole 42c is prepared as a long hole which matches the shaft portion 38 of the weld bolt 37 in the vertical direction and has a play in the front-rear direction, thereby (i) positioning the whole rail cover 10 in the vertical direction while canceling a tolerance error of the cover portion 11 in the longer direction, and (ii) determining the inclination around the first bolt through hole 41c. The positioning of this front end portion in the vehicle's right-left direction is performed by making the second pedestal portion 42b and the second pedestal portion 42a to contact with each other, similar to the above positioning of the rear end portion of the cover portion 11.

The third bolt through hole 43c, provided at an upper end portion of the extension 12 which is longer in the vertical direction, should have play allaround the circumference of the shaft portion 38 of the weld bolt 37, and may be a circular hole. Accordingly, tolerance errors of the extension 12 in the longer (i.e., vertical) direction and a direction substantially perpendicular to the longer direction (i.e., the front-rear direction) can be eliminated. The upper end portion of the extension 12 is positioned in the right-left direction by making the third pedestal portion 43b and the third pedestal portion 43a to contact with each other. Therefore, together with the positioning of the front and rear end portions of the cover portion 11 in the right-left direction, the position in the right-left direction and the inclination of the whole rail cover 11 are determined.

After the above-explained positioning of the rail cover 10 with respect to the vehicle body, each pedestal portion is fastened to a corresponding fixed portion via a dedicated nut 39, thereby easily achieving a preferable accuracy in the mounting of the rail cover 10. In this state, the fastening of the rail cover 10 to the vehicle body has been almost completed. Finally, the fourth, fifth, and sixth pedestal portions 44b, 45b, and 46b, provided between the first pedestal portion 41b and the second pedestal portion 42b of the cover portion 11 (which is longer than the extension 12), are respectively combined with the fourth, fifth, and sixth pedestal portions 44a, 45a, and 46a via dedicated nuts 39, thereby completing the fastening of the rail cover 10 to the vehicle body.

The fastening of the front and rear portions of the cover portion 11 and the upper end portion of the extension 12 of the rail cover 10 to the vehicle body are performed in a welding process of the vehicle manufacturing line, that is, before a coating or painting process. Conversely, the fastening of the center portion of the cover portion 11 of the rail cover 10 to the vehicle body is performed in an assembling process of the vehicle manufacturing line, that is, after the coating or painting process.

As explained above, the fastening of the rail cover 10 to the vehicle body has been almost completed in the welding process, thereby preventing nonuniformity in coating between the vehicle body and the rail cover 10. In addition, a seal member may be inserted in advance between the rail cover 10 and the vehicle body. Therefore, it is possible to have preferable sealing capability and sound insulation without performing troublesome operations in the assembling process, such as removing the rail cover 10 before sealing, and attaching the rail cover 10 again after the sealing.

As shown in FIG. 4, the weather strip 21, attached to the support flange 22 of the rear fender 15, closely contacts the rear side glass 8 at the outside of the support flange 22 in the vehicle's width direction. The front edge of the rear side glass 8 is supported by an elastic hinge, so that the rear side glass 8 can be opened or closed. A holding lip 21a, closer to the outside of the vehicle, is provided at the lower edge of the weather strip 21, and an upper edge of the rail cover 10 is received and held by the holding lip 21a.

As shown in FIGS. 6 and 7, a suitable gap S2 is provided between the extension 12 and the pillar outer portion 16a. As the rear edge of the extension 12 faces the back of the vehicle, the gap S2 is open backward at the back end of the vehicle body. In order to hide the gap S2 from the rear side of the vehicle when the tail gate 27 is open, a screening cover 50 (i.e., a screening member) made of a resin or the like is provided between the rear edge of the extension 12 and the rear edge of the pillar outer portion 16a.

The screening cover 50 has a substantially L-shaped cross-section and extends along the rear pillar 16. The screening cover 50 has a bottom wall 51 slightly inclined from the vehicle's width direction, and a side wall 52 extending substantially backward from a rear edge portion of the bottom wall 51. The bottom wall 51 is arranged behind the back wall 16b attached to the pillar outer portion 16a, in a manner such that the bottom wall 51 overlaps with the back wall 16b, and the back wall 16b and the bottom wall 51 function as a bottom of a drip gutter portion provided along a side of the rear opening of the vehicle. The side wall 52, provided at the outer end (i.e., the end closer to the outside in the vehicle's width direction) of the bottom wall 51, is arranged at the rear edge of the extension 12 in a manner such that the side wall 52 overlaps with the rear edge from the inside of the vehicle.

At the back face (which faces the front of the vehicle) of the inner end of the bottom wall 51, an inner seal member 53 is provided, which closely contacts the back wall 16b attached to the pillar outer portion 16a. At an outer face (which faces the outside of the vehicle) of the rear edge of the side wall 52, an outer seal member 54 is provided, which closely contacts a rear edge of the extension 12. The seal members 53 and 54 prevent water from entering the gap S2 between the rail cover 10 and the pillar outer portion 16a.

In the back face of the screening cover 50, a plurality of fastening clips 55 (three clips in the present embodiment) are arranged along the rear pillar 16. The screening cover 50 is fastened to the vehicle body by engaging the fastening clips 55 to corresponding clip holes 55a which are formed in the back wall 16b. In addition, an upper end portion of the screening cover 50 is fastened to an upper end portion of the rear pillar 16 via a velcro fastener 56 which is provided for preventing the upper end portion of the screening cover 50 from separating from the rear pillar 16. In addition, a rib 57 for stably fastening the screening cover 50 is provided in the bottom wall 51, where in the vehicle's width direction, the position of the rib 57 is closer to the outside of the vehicle in comparison with the fastening clips 55 and the rib 57 contacts the back wall 16b (attached to the outer pillar portion 16a) via a cushioning material 57a.

As explained above, the body structure for a vehicle having a sliding door in the above embodiment has a rail cover 10 for covering the center slide rail 6, where the center slide rail 6 is provided at a side face of the vehicle body so as to guide the rear sliding door 3. The rail cover 10 has a cover portion 11 extending along a lower edge of the rear side glass 8, and the extension 12 extending from a rear portion of the cover portion 11 along the rear pillar 16. This rail cover 10 is positioned for the vehicle body in the front-rear direction and in the vertical direction, via a rear end portion of the cover portion 11.

According to the above structure, it is possible to prevent a joint line from appearing between the vehicle body panel and the rail cover 10 in the vicinity of the rear pillar 16, thereby improving the appearance of the vehicle.

The rail cover 10 is a relatively large member including the cover portion 111 and the extension 12. However, the rail cover 10 is positioned in a well-balanced form via the rear end portion of the cover portion 11 (i.e., the joint portion of the cover portion 11 and the extension 12), thereby easily securing a desired accuracy in mounting of the whole rail cover 10 and improving the performance of mounting the rail cover 10.

The rail cover 10 is also positioned in the vertical direction via a front end portion of the cover portion 11, thereby easily securing desired accuracies in positioning in the vertical direction and for inclination.

In addition, in the vehicle body structure in the above embodiment, the rear edge of the extension 12 faces backward, and the screening cover 50 is provided between the rear edge of the extension 12 and the corresponding vehicle body panel. Therefore, no joint line appears between panels in the vicinity of rear pillar 16, and a gap between the rear edge of the extension 12 and the vehicle body panel is covered by a screening member. Therefore, it is possible to further improve the appearance of the vehicle.

Furthermore, in the above vehicle body structure, the rail cover 10 has a hollow and closed-section structure; thus, the weight of the rail cover 10 can be reduced and the rigidity of the rail cover 10 can be improved. Therefore, the rail cover 10 can be easily handled, and performance in mounting the rail cover 10 can be further improved.

In addition, in the above structure, the seal member 36 as an elastic member is inserted between inner faces (which face each other) of the closed-section structure, thereby preventing reverberating sound from being generated when vibration acts on the rail cover 10. Therefore, it is possible to improve salability.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, the rail cover 10 may be made of a resin, and the screening cover 50 may be made using a steel plate.

Accordingly, the invention is not to be considered as being limited by the foregoing description, and is only limited by the scope of the appended claims. For example, the present invention can be applied to vehicles having not only power sliding doors but also well-known manually opened or closed sliding doors, or to known vehicles of a 1-box type.

What is claimed is:

1. A body structure for a vehicle having a sliding door, the structure comprising:
   a slide rail, provided in a side face of the vehicle, for guiding the sliding door; and
   a rail cover, having a cover portion and an extension, for covering the slide rail,
   wherein the cover portion extends along a lower edge of a rear side glass of the vehicle in a front-rear direction, and the extension, positioned on a rear pillar, extends in a vertical direction from a rear end portion of the cover portion toward a roof of the vehicle along a rear edge of the rear side glass, and the rail cover is positioned on a body of the vehicle in the front-rear direction and the vertical direction via the rear end portion of the cover portion.

2. The body structure as claimed in claim 1, wherein the rail cover is further positioned in the vertical direction via a front end portion of the cover portion.

3. The body structure as claimed in claim 1, wherein the extension has a rear edge which faces a back of the vehicle, and the body structure further comprises:
   a screening member provided between the rear edge of the extension and a panel of the body of the vehicle.

4. The body structure as claimed in claim 1, wherein the rail cover has a hollow and closed-section structure.

5. The body structure as claimed in claim 4, further comprising:
   an elastic member inserted between inner faces of the rail cover, which face each other.

6. The body structure as claimed in claim 1, wherein said rear end portion of the cover portion includes a first bolt that is received in a first hole formed in the vehicle body so as to position the cover portion in both the vertical direction and the front-rear direction.

7. The body structure as claimed in claim 6, wherein said first bolt includes a shaft portion, and wherein the first hole is a circular hole into which the shaft portion closely fits.

8. The body structure as claimed in claim 7, wherein a front end portion of the cover portion includes a second bolt that is received in a second hole formed in the vehicle body, said second hole being elongated in the front-rear direction of the vehicle so as to have a vertical dimension closely matching that of a shaft portion of said second bolt while having a front-rear dimension that is greater than that of the second bolt shaft portion so as to permit adjustment of the cover portion forward end in the front-rear direction.

9. The body structure as claimed in claim 8, wherein an upper end portion of the extension includes a third bolt that is received in a third hole formed in the vehicle body, said third hole being elongated in the vertical direction so as to have a front-rear dimension closely matching that of a shaft portion of said third bolt while having a vertical dimension that is greater than that of the second bolt shaft portion so as to permit adjustment of the cover portion extension in the vertical direction.

* * * * *